(12) United States Patent
Breault

(10) Patent No.: US 7,108,937 B2
(45) Date of Patent: Sep. 19, 2006

(54) REDUCING PEM FUEL CELL HARD FREEZE CYCLES

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 232 days.

(21) Appl. No.: 10/687,010

(22) Filed: Oct. 16, 2003

(65) Prior Publication Data

US 2005/0084735 A1 Apr. 21, 2005

(51) Int. Cl.
*H01M 2/08* (2006.01)
(52) U.S. Cl. ............................. 429/35; 429/26; 429/34; 429/38
(58) Field of Classification Search ...................... None
See application file for complete search history.

(56) References Cited

U.S. PATENT DOCUMENTS 4,548,874 A * 10/1985 Katz et al. ..................... 429/18

* cited by examiner

*Primary Examiner*—Patrick Joseph Ryan
*Assistant Examiner*—Julian Mercado
(74) *Attorney, Agent, or Firm*—M. P. Williams

(57) ABSTRACT

The reactant gas manifolds (12–15) of a PEM fuel cell are modified to provide insulated manifolds (14*a*) having inner and outer walls (30, 31) closed off by a peripheral wall (35) to provide a chamber (36) which may be filled with a vacuum, a low thermal conductivity gas, a VIP (59) or a GFP (63). Single walled manifolds (14*d*, 14*e*) may have VIPs or GFPs inside or outside thereof. An insulation panel (40) similarly has inner and outer walls (42, 43) closed with a peripheral wall (45) so as to form a chamber (46) that may contain a vacuum, a low thermal conductivity gas, a VIP or a GFP. The tie rods 9*a* may be recessed 50 into the pressure plate 11*a* of the fuel cell stack to allow a flush surface for the insulation panel 40.

8 Claims, 5 Drawing Sheets

REDUCING PEM FUEL CELL HARD FREEZE CYCLES

TECHNICAL FIELD

This invention relates to reducing hard freeze cycles in PEM fuel cells by means of insulators, which are integral with, inside or outside of the manifolds, and end plate insulators.

BACKGROUND ART

A typical configuration for PEM fuel cells of the type that might be utilized to provide power for electric cars is illustrated in FIGS. 1 and 2. Typically, a plurality of contiguous fuel cells 7 are pressed together into a stack 8 so as to provide good electrical conductivity and no leakage of fluids, by means of tie rods 9 which draw together pressure plates 11 (sometimes referred to as "end plates"). All four sides of the fuel cell stack 8 are fitted with manifolds 12–15 for the various reactant gases, which are sealed to the stack by means of rubber sealants, gaskets and combinations thereof 18, as is described more fully with respect to FIG. 3 hereinafter. As an example, the manifold 12 may comprise an air inlet and air outlet manifold, the manifold 13 may comprise an air turnaround manifold, the manifold 14 may comprise a fuel inlet and outlet manifold, and a manifold 15 may comprise a fuel turnaround manifold. In addition, there may be a coolant inlet 20 which would feed an internal coolant manifold (not shown) and a coolant outlet 21, for coolant exiting from the internal coolant manifold. The coolant manifold may also be part of an external manifold configuration.

In the general case, vehicles must be able to be operated, parked and reoperated in ambient temperatures which fall below the freezing point of water. It is known that boot strap starts (without preheating) of fuel cell stacks from temperatures of about −20° C. cause a degradation of fuel cell performance, and many boot strap starts from freezing temperatures can render the fuel cell incapable of the performance required to operate a vehicle. In such a case, processes must be performed in order to regenerate the fuel cell and restore its performance.

To isolate a fuel cell from a freezing environment, it is obvious to consider the use of insulation. Typically, in order to prevent a fuel cell stack from reaching 0° C. in 60 hours when shut down in a −20° C. ambient, 9 centimeters of fiberglass insulation or 5 centimeters of closed foam insulation would typically be required. Use of common insulation, such as fiberglass, can more than triple the volume which the fuel cell power plant would occupy in a vehicle. When the fuel cell is to be utilized to provide electric power to a vehicle, the space taken up by the fuel cell's power plant is critical. An adequate amount of closed cell foam would approximately double the volume that a fuel cell power plant would occupy in a vehicle. It has been determined that the volumes with insulation described above are intolerable for fuel cell power plants in vehicles.

DISCLOSURE OF INVENTION

Objects of the invention include: a fuel cell power plant which will not reach 0° C. when inoperative in an ambient environment of −20° C. for about 60 hours; reducing hard freeze cycles of fuel cell power plants; a fuel cell power plant in which the water therein will not reach a hard freeze when the power plant is inoperative in an ambient environment of −20° C. for about 180 hours, or −10° C. for about 290 hours; improved insulation of a fuel cell stack in a vehicle fuel cell power plant; and improved startup operation of a vehicular fuel cell power plant in subfreezing temperatures.

According to the present invention, the reactant gas manifolds on a PEM fuel cell are single or double walled and insulated with vacuum, low thermal conductivity gas, gas-filled panels (GFPs), or vacuum insulation panels (VIPs). According to the invention further, the tie bolts which provide the compressive force between pressure plates of a PEM fuel cell are recessed into the pressure plates, and the pressure plates are insulated from ambient atmosphere by means of double walled insulator panels, such as chambers which are evacuated or filled with low thermal conductivity gas, VIPs or GFPs.

As an example, a 300 cell 75 kilowatt PEM fuel cell having normal metal external manifolds for the reactant gases occupies 72 liters. The addition of one centimeter of VIP insulation, in accordance with the invention, increases the volume by 15 liters, to 87 liters. In contrast, to achieve an equivalent thermal resistance, 9 centimeters of fiberglass insulation would be required which would increase the volume of the same fuel cell stack to an unacceptable 241 liters.

Herein, the summation of the products of (a) number of days at any specific temperature below 0° C. times (b) said specific temperature is defined as "minus-degree-days". It is permissible for a significant portion of the water in the stack to freeze; but it is preferred that not all of the water freeze. Product water can readily be removed from a stack whose temperature is not less than 0° C. during a boot strap start. This environmental storage condition is equivalent to 150 minus-degree-days.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
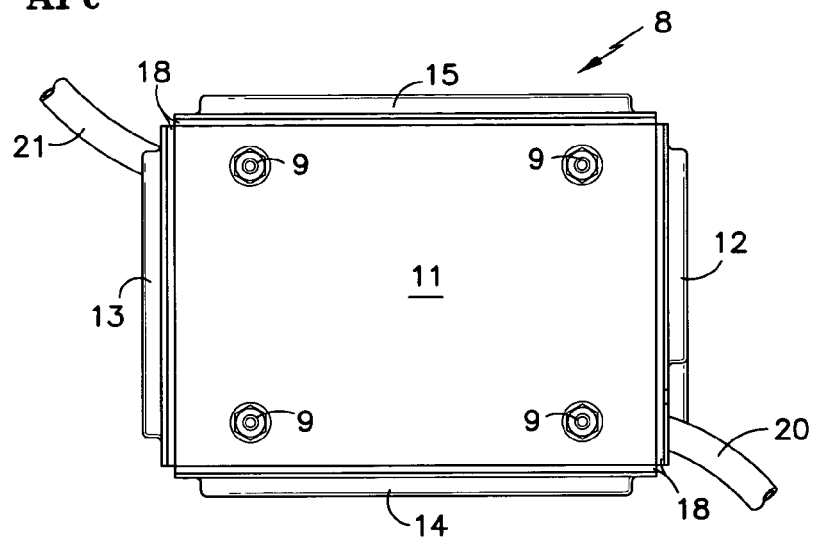
FIGS. 1 and 2 are simplified and stylized end and side, respectively, elevation views of a PEM fuel cell stack having external reactant gas manifolds which are known to the prior art, and which may be modified in accordance with the present invention.
Figure 2:
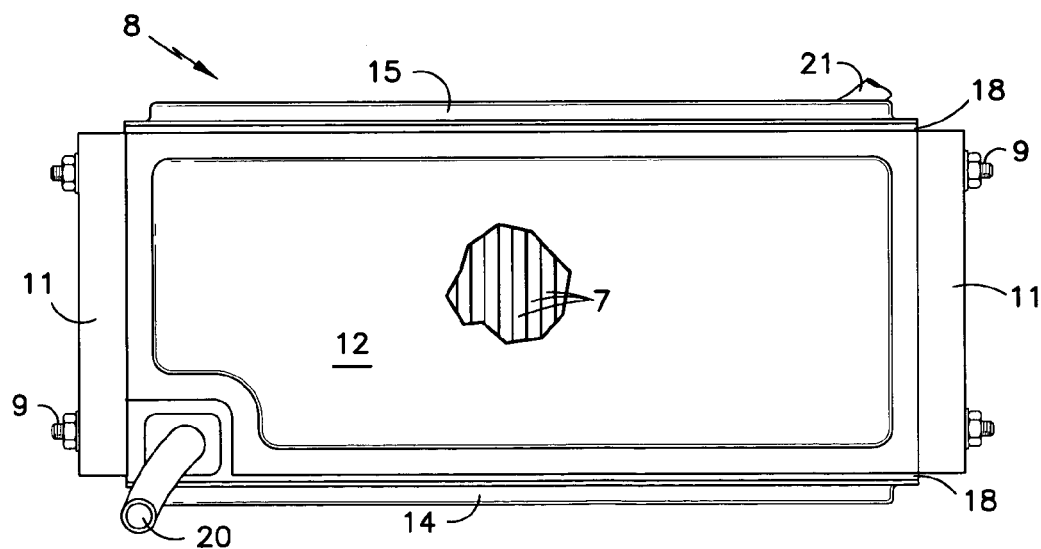
Figure 3:
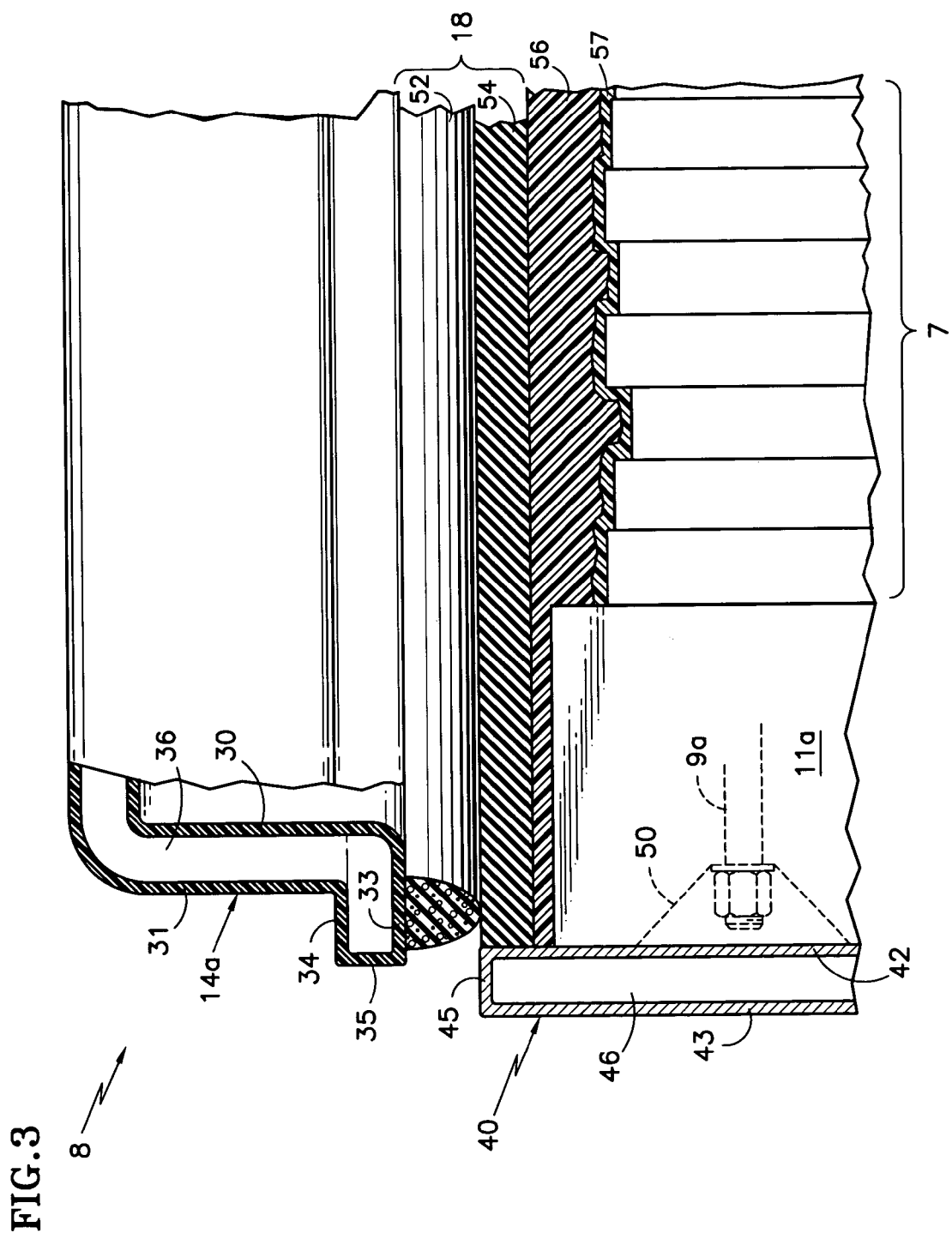
FIG. 3 is a partial, partially sectioned, side elevation view of an external manifold formed of double walled insulation such as a vacuum insulation panel or a panel filled with low thermal conductivity gas, and a similarly composed insulation panel for the fuel cell stack pressure plate.

Referring to FIG. 3, the fuel inlet and outlet manifold 14 of the prior art is modified to provide a reactant gas manifold 14a which has inner and outer walls 30, 31 joined completely around their peripheral edges 33, 34 by a thin wall 35, to form a chamber 36 which may be evacuated or which may contain high molecular weight, low thermal conductivity gas, such as argon, krypton or xenon. The manifold 14a is typically formed of resin/fiberglass composite, but it may be made of other materials, including metal.

In accord with the invention further, an insulator plate 40 similarly has inner and outer walls 42, 43 which are joined at all of their peripheral edges by a thin wall 45, so as to provide a chamber 46 which may contain either a vacuum or a high molecular weight, low thermal conductivity gas. In order to allow for the insulator plate 40, the tie rods 9a are recessed into frustoconical recesses 50 so as to present a flush surface for contact with the insulator plate 40.

The manifold 14a may be sealed to the fuel cell stack with a foam gasket 52, a rubber gasket 54, low viscosity silicone rubber 56 and high viscosity silicone rubber 57, as disclosed in U.S. patent application Ser. No. 09/882,750, filed Jun. 15, 2001.

Figure 4:
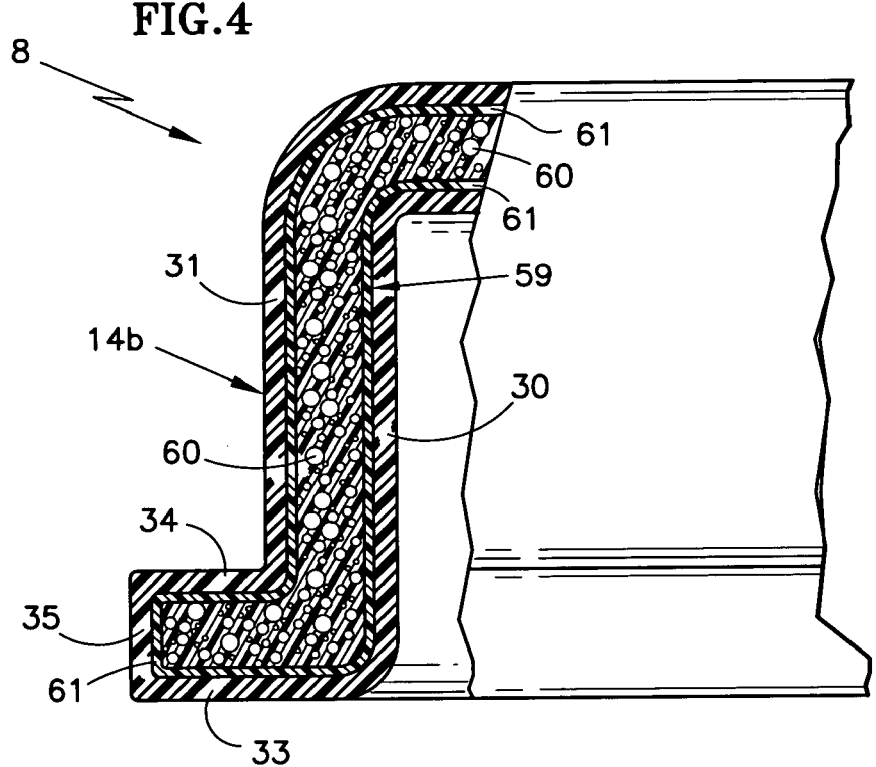
FIG. 4 is a partial, partially sectioned side elevation view of a reactant gas manifold with an integral VIP.

Instead of a vacuum or low thermal conductivity gas, the chamber 36 of FIG. 3 may contain a vacuum insulated panel (VIP) 59, as shown in FIG. 4. VIP is defined herein to consist of a filler material 60 called a "core" that is encapsulated in a barrier film 61, which may simply be plastic, or may be a plastic film which is sputter coated with thin metal film, or may be an aluminum or other metal thin film reinforced by plastic film laminations on each side with the barrier film evacuated to a pressure between 0.001 Torr (0.0013 mbar) and 1.0 Torr (1.3 mbar), and thereafter sealed. The details of the VIP are irrelevant to the present invention, and may be chosen to suit any particular implementation thereof. The core may be thermal formed to the shape of the manifold prior to being encapsulated within the barrier film. The manifold may simply comprise the VIP 59 formed in the shape of a manifold, with a puncture resistant film attached to one or both sides of the VIP to provide enhanced structural integrity.

The core material serves three main purposes. First, the core supports the panel walls. Since atmospheric pressure exerts 14.7 psi on the evacuated panel, a one square foot panel would be subject to 2,120 pounds of force. Second, the core material also inhibits the movement of the remaining gas molecules. The smaller the core pore size, the more likely it is that the gas molecules will collide with the branched network of the core material rather than reaching the walls of the VIP. This essentially traps the molecules, and any heat that is conducted to the solid core material would have to pass through a tortuous branch network, where it is mostly dissipated, prior to reaching the walls of the VIP. A core that is based on microporous material, having the smallest pore size, therefore provides the best insulating performance of any solid material. Third, the core materials provide a barrier against heat transfer by radiation and often include special opacifying materials that scatter or absorb infrared radiation. VIPs can presently be provided with thermal conductivities of between 0.002 Watts per meter degree Kelvin (W/m° K), and 0.008 W/m° K.

Figure 5:
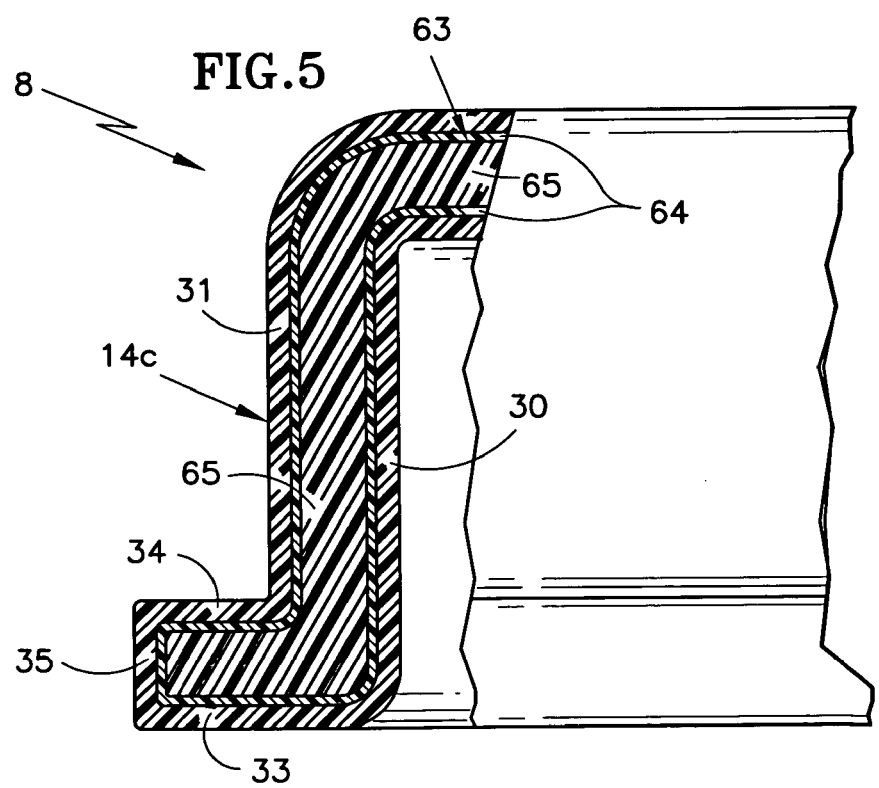
FIG. 5 is a partial, partially sectioned side elevation view of a reactant gas manifold with an integral GFP.

Referring to FIG. 5, the insulation of a reactant gas manifold 14c may comprise a gas filled panel (GFP) 63. GFP is defined herein as a high molecular weight, low thermal conductivity gas within a hermetic polymer film bag 64 to provide extraordinary thermal insulation. Within the essentially-hermetic barrier provided by the film 64, a cellular structure 65, called a baffle, is filled with the gas. Argon gas provides an effective thermal conductivity of 0.020 W/m° K, krypton gas provides a thermal conductivity of 0.012 W/m° K, and xenon gas provides a thermal conductivity of 0.007 W/m° K.

Figure 6:
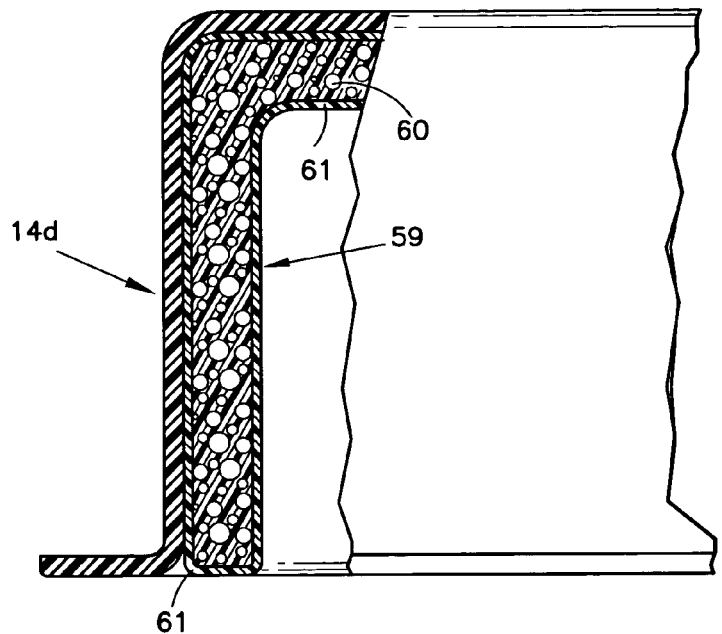
FIG. 6 is a partial, partially sectioned side elevation view of a reactant gas manifold with a VIP disposed internally thereof.

Referring to FIG. 6, a reactant gas manifold 14d may be formed as a single shell of resin/fiberglass composite (or metal, if desired), with a VIP 59 (as described with respect to FIG. 4) disposed on the inside of the manifold 14d. In this case, if required, an additional film may be applied on the inner portion of the VIP 59 so as to provide a surface which is compatible with and impervious to the particular reactant gas within the manifold 14d. Instead of a VIP 59 of the type described with respect to FIG. 4, a GFP 63 of the type described with respect to FIG. 5 may be disposed internally of the manifold 14d.

Figure 7:
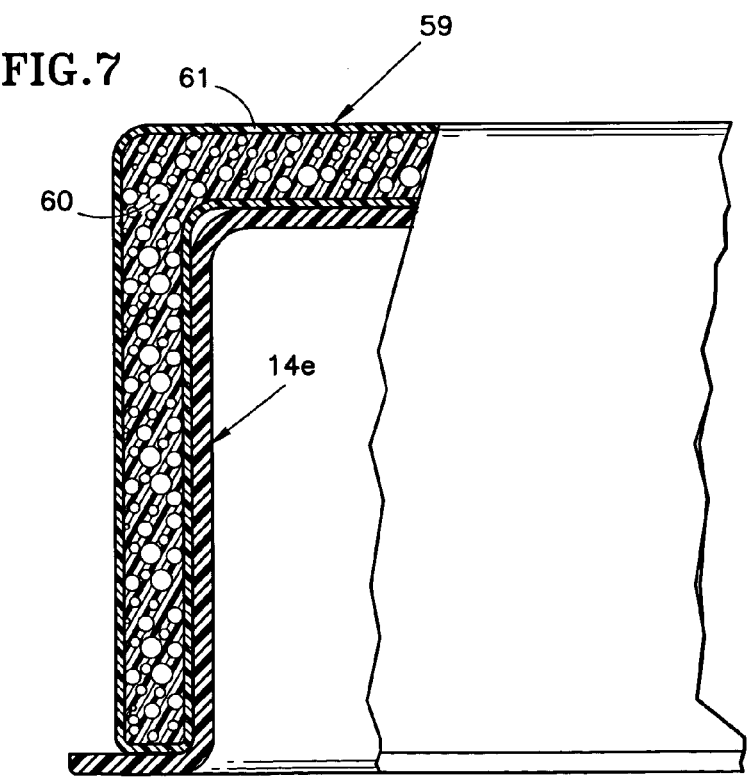
FIG. 7 is a partial, partially sectioned side elevation view of a reactant gas manifold with a VIP disposed externally thereof.

The insulation may be provided externally of a manifold 14e as illustrated in FIG. 7. The insulation may be a VIP 59 described with respect to FIG. 4, or it may be a GFP 63 of the type described with respect to FIG. 5.

Figure 8:
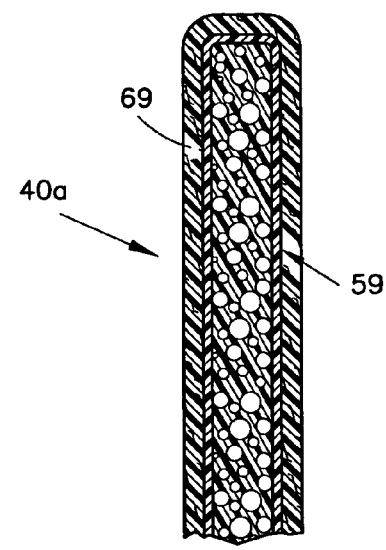
FIG. 8 is a partial, partially sectioned end elevation view of a VIP for a fuel cell stack end plate.

In FIG. 3, the insulation panel 40 for the end plate 11a is hollow, and the chamber 46 therein is either evacuated or filled with a high molecular weight, low thermal conductivity gas. In FIG. 8, an insulation panel 40a, which may be used with the end plate 11a, contains a VIP 59 of the type described with respect to FIG. 4. The panel 40a may comprise the VIP 59 with a suitable puncture resistant film 69, such as a resin/fiberglass composite surrounding the VIP 59.

Figure 9:
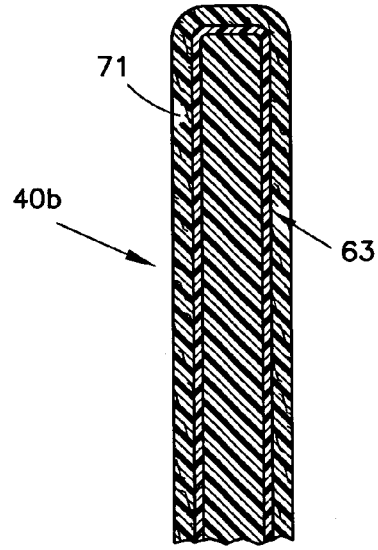
FIG. 9 is a partial, partially sectioned end elevation view of a GFP for a fuel cell stack end plate.

Similarly, an insulation panel 40b shown in FIG. 9 may comprise a GFP 63 of the type described with respect to FIG. 5, surrounded by a film 71 to provide structural integrity. This may comprise a resin/fiberglass composite, or other suitable durable plastic.

Figure 10:
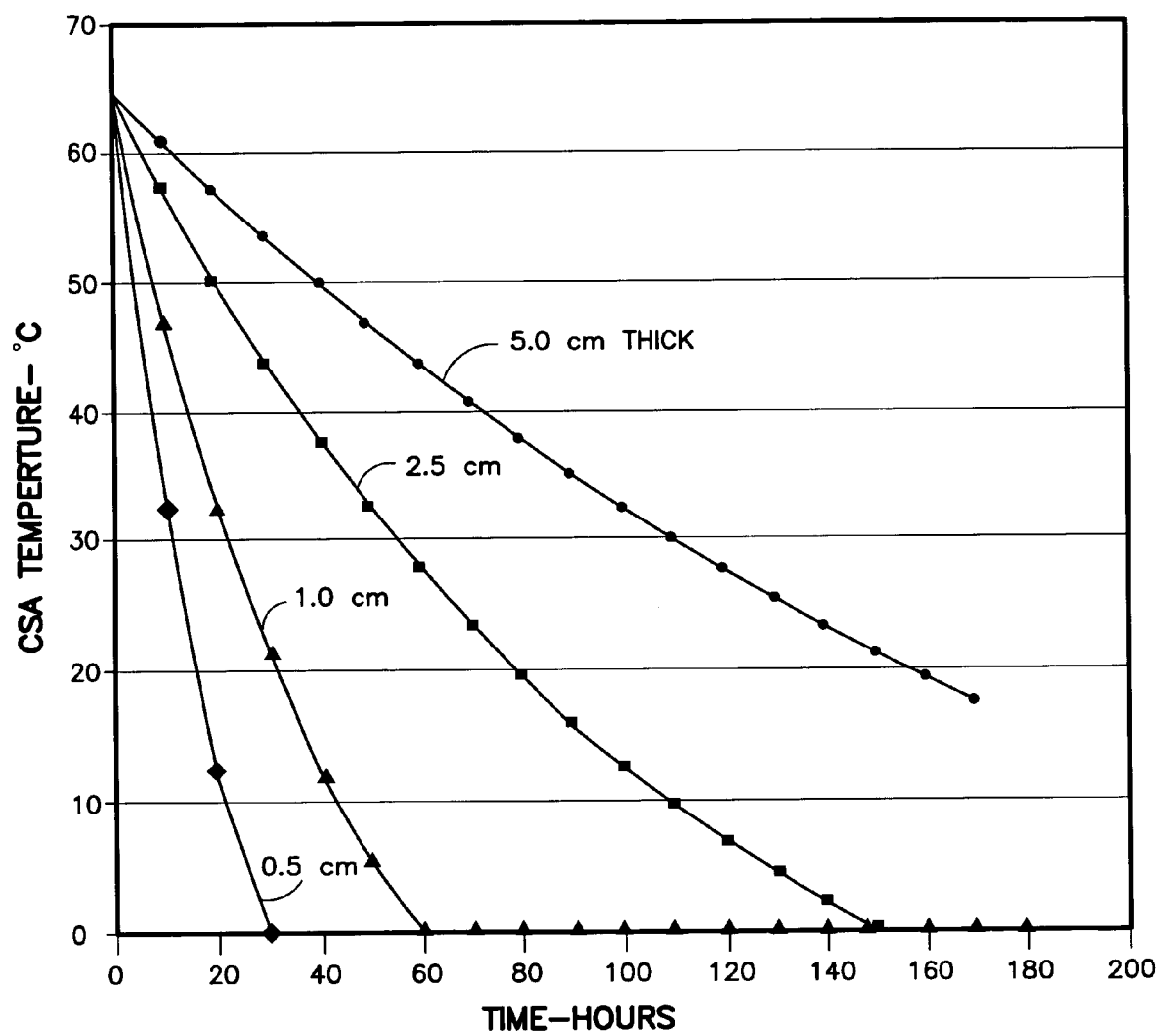
FIG. 10 is a chart illustrating cool down rate for vacuum insulation panels ranging from ½ centimeter to 5 centimeters in thickness.

Referring now to FIG. 10, cool down rates, for an ambient temperature of −20° C., are illustrated for a PEM fuel cell stack having an average mass times heat capacity (mCp) of about 16 watt-hours per degree C., and an external area on the order of 9300 square centimeters, insulated according to the invention with vacuum insulation panels of varying thickness, each with a thermal conductivity of 0.004 W/m° K. The illustrated fuel cell stack utilizes porous graphite water transport plates as reactant flow fields, and has a water inventory of about 8.0 Kg of water.

In FIG. 10, with insulation having a thickness of 1.0 centimeter, the cell stack assembly temperature reaches 0° C. after about 60 hours, but it takes 180 hours to reach a hard freeze, as illustrated by the triangular marks in FIG. 10. A hard freeze occurs when one hundred percent of the water, held within the fuel cell, has solidified. Should the ambient environment temperature be only −10° C., the cell stack assembly temperature will reach 0° C. after about 78 hours, and will reach a hard freeze after about 290 hours.

The choice may be made between volume (due to thickness of the insulation) vs. the length of time desired before the fuel cell stack reaches 0° C. or reaches a hard freeze, bearing in mind that insulation of 5.0 centimeters thickness more than doubles the volume required for the fuel cell stack, whereas a one-half centimeter thickness of insulation according to the invention would yield an increase of about 12% in volume.

The time period to reach a hard freeze with one centimeter of VIP 59 corresponds to 150 minus-degree-days or about 180 hours for an ambient temperature of −20° C.

Thus, the invention may utilize insulation panels having thicknesses ranging from a fraction of a centimeter to five or more centimeters, with thermal conductives ranging from about 0.002 W/m° K to about 0.020 W/m° K, and will prevent the fuel cell stack from experiencing a hard freeze for a period equivalent to 150 minus-degree-days.

The invention may also be utilized with cell stacks which have an ultra-thin current collection sheet associated with an insulation panel, as illustrated in a commonly owned, copending U.S. patent application, Ser. No. 10/687,242 filed contemporaneously herewith and entitled "Fuel Cell Stack Having Improved Current Collector and Insulator".

Although described with respect to a fuel manifold, the invention incorporates oxidant and other reactant gas manifolds.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell stack having:
a plurality of fuel cells disposed between current-collecting end plates; and having water therein; and
at least one reactant gas manifold;
characterized by the improvement comprising:
each said at least one reactant gas manifold comprising either (a) a single wall, with a VIP or GFP disposed inside or outside said single wall, or (b) a double wall forming a chamber, said chamber containing a vacuum, a low thermal conductivity gas, a VIP or a GDF; and
an insulator panel disposed on an external surface of each of said end plates, each insulator panel comprising either (a) a hollow chamber containing a vacuum or a low thermal conductivity gas, or (b) a VIP, or (c) a GFP.

2. A fuel cell stack according to claim 1 wherein:
said fuel cell stack has a plurality of said reactant gas manifolds; and
the insulation provided by said manifolds and said insulator panels is sufficient so that the water in said stack is not totally frozen when said fuel cell stack is inoperative in an ambient environment for greater than fifty minus-degree-days.

3. A fuel cell stack according to claim 1 wherein:
said fuel cell stack has a plurality of said reactant gas manifolds; and
the insulation provided by said manifolds and said insulator panels is sufficient so that the water in said stack is not totally frozen when said fuel cell stack is inoperative in an ambient environment for about 100 minus-degree-days.

4. A fuel cell stack according to claim 1 wherein:
said fuel cell stack has a plurality of said reactant gas manifolds; and
the insulation provided by said manifolds and said insulator panels is sufficient so that the water in said stack is not totally frozen when said fuel cell stack is inoperative in an ambient environment for about 150 minus-degree-days.

5. A fuel cell stack comprising:
a plurality of fuel cells disposed between current-collecting end plates; and
an insulator panel disposed on an external surface of each of said end plates, each insulator panel comprising either a VIP or a GFP.

6. A fuel cell stack according to claim 5 wherein said insulator panels comprise either (a) a VIP or (b) a GFP with an external film of (c) plastic or (d) resin/fiberglass composite for enhanced structural integrity.

7. An insulated reactant gas manifold for a fuel cell stack comprising either (a) a single wall, with a VIP or GFP disposed inside or outside said single wall, or (b) a double wall forming a chamber, said chamber containing a VIP or a GFP.

8. A manifold according to claim 7 wherein said double wall forming a chamber comprises a layer of either (c) plastic or (d) resin/fiberglass composite on the surfaces of (e) a VIP or (f) a GFP for enhanced structural integrity.

* * * * *